(12) United States Patent
Fredrickson et al.

(10) Patent No.: US 7,040,437 B1
(45) Date of Patent: May 9, 2006

(54) ENGINE AIR INTAKE SYSTEM

(75) Inventors: Richard Fredrickson, Roseau, MN (US); Jan Hedlund, Roseau, MN (US); Jim Vizanko, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/752,280

(22) Filed: Jan. 6, 2004

(51) Int. Cl.
*B60K 13/02* (2006.01)

(52) U.S. Cl. ...................... 180/190; 180/68.3

(58) Field of Classification Search ........... 180/190, 180/68.3, 68.1, 69.2; 440/88 A; 123/41.56, 123/41.58; 406/12, 13
See application file for complete search history.

(56) References Cited

U.S. PATENT DOCUMENTS

| | | | |
|---|---|---|---|
| 3,819,000 A | 6/1974 | Larsen | 180/5 R |
| 4,637,486 A | 1/1987 | Iwai | 180/225 |
| 4,782,912 A | 11/1988 | Wandless | 181/229 |
| 4,878,555 A * | 11/1989 | Yasunaga et al. | 180/68.3 |
| 5,016,728 A | 5/1991 | Zulawski | 181/229 |
| 5,251,718 A | 10/1993 | Inagawa et al. | 180/190 |
| 5,340,344 A | 8/1994 | Mineo et al. | 440/88 |
| 5,660,243 A | 8/1997 | Anzalone et al. | 180/68.1 |
| 6,056,075 A | 5/2000 | Kargilis | 180/68.1 |
| 6,105,701 A | 8/2000 | Buell | 180/229 |
| 6,216,809 B1 * | 4/2001 | Etou et al. | 180/68.3 |
| 6,439,328 B1 | 8/2002 | Vaillancourt et al. | 180/68.1 |
| 6,742,618 B1 * | 6/2004 | Schoenfelder et al. | 180/182 |
| 2002/0084125 A1 | 7/2002 | Scheumacher et al. | 180/190 |
| 2002/0088656 A1 | 7/2002 | Bergman | 180/68.3 |
| 2002/0153182 A1 | 10/2002 | Vaillancourt et al. | 180/68.1 |

* cited by examiner

*Primary Examiner*—Tony Winner
(74) *Attorney, Agent, or Firm*—Baker & Daniels LLP

(57) ABSTRACT

An engine air intake system for vehicles such as snowmobiles. The air intake system helps prevent airborne contaminants from entering the vehicle engine through the air intake. The intake includes an elongated channel with openings on either end that provides a throughway for contaminants entering the channel. A wall of the channel includes at least one aperture leading to an intake port on an engine cylinder. The intake port is positioned generally parallel to the direction of airflow through the channel.

31 Claims, 10 Drawing Sheets

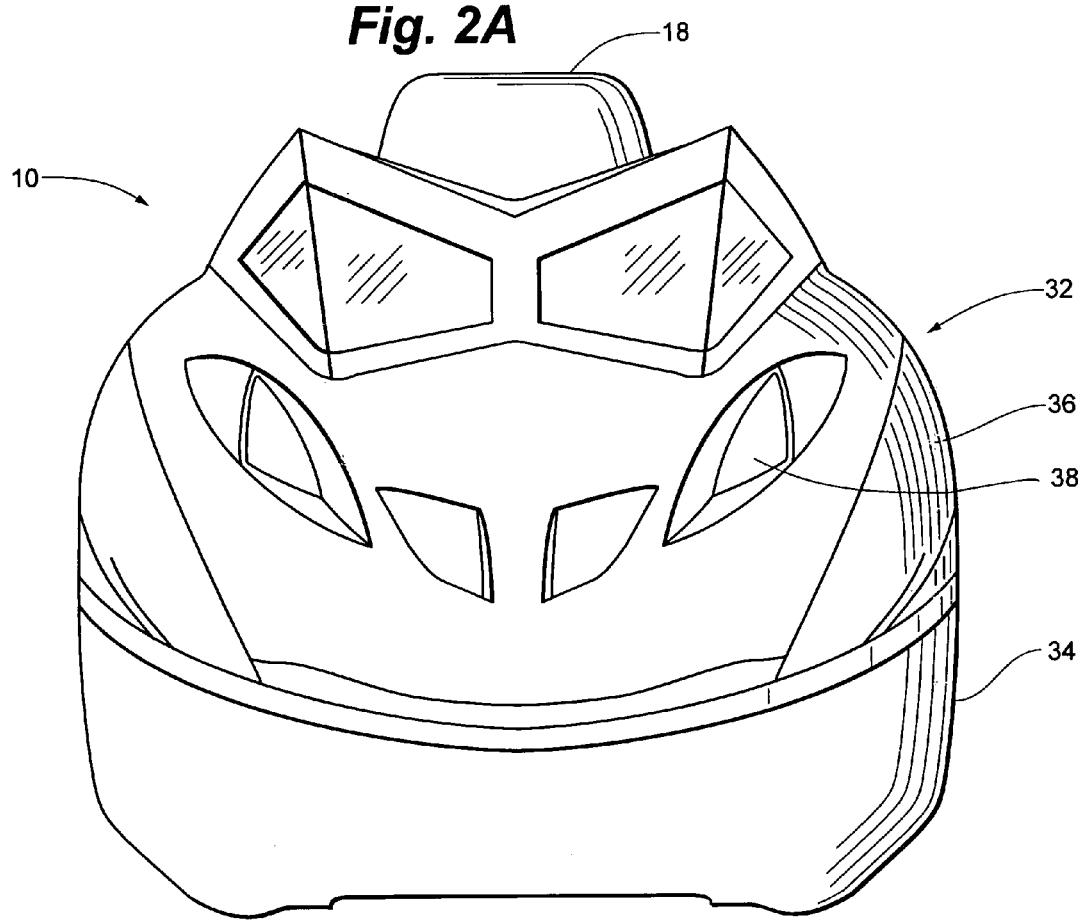

ENGINE AIR INTAKE SYSTEM

TECHNICAL FIELD

The invention relates to vehicles having internal combustion engines, and in particular, the invention relates to such vehicles having improved air intakes for such engines.

BACKGROUND OF THE INVENTION

It is well known that many vehicles, including motorcycles, snowmobiles, all-terrain vehicles, watercraft, and the like, are powered by internal combustion engines. Typically, these engines are positioned within engine compartments and are adapted to propel the vehicles. Generally, each internal combustion engine has one or more cylinders (i.e., combustion chambers) each communicating with an air intake and a fuel supply. The engine generates power in each cylinder by combusting a mixture comprising air supplied from the air intake and fuel from the fuel supply. Typically, the air supplied to the air intake is obtained from the ambient air surrounding the vehicle. However, as is well known, it is undesirable to allow contaminants from the air, such as water, dirt, and the like, to enter the air intake of such an engine, as the contaminants may plug the air intake. Alternatively, if the contaminants pass through the air intake and enter the cylinder(s), the engine could likely stall or stop. In addition, if the contaminants pass through the air intake, they could seriously damage the engine. For example, if water enters one of the cylinders, it can remove lubrication from the cylinder wall, causing piston seizure. Additionally, if water enters the engine crankcase, it can cause corrosion of the crankcase and needle bearings.

The vehicles mentioned above generally have one or more openings in their engine compartments that enable the entry of the ambient air into the air intake. For example, on a snowmobile, it is most common to find these vent openings near the operator of the vehicle, generally in the snowmobile console. One advantage of positioning the openings in this location is that airborne contaminants are less likely to fly into the openings from the rear side of the body assembly. In turn, there would be less chance for these contaminants to either plug the air intake or pass through the air intake and damage the engine. However, one disadvantage of positioning the vent openings in this location is that noise from the engine generally travels back through the air intake and out the openings, thereby creating a nuisance for the operator. Another disadvantage is the relative lack of fresh air that enters the air intake from the rear side of the body assembly.

As such, it is desirable to provide an air intake system for vehicles that prevents airborne contaminants from entering the engine through the air intake. Additionally, it would be desirable to prevent the entry of contaminants into the engine while modifying the air intake so that the engine noise traveling back through the air intake to reach the operator may be reduced or even eliminated, and so that fresh air may be received by the air intake.

SUMMARY OF THE INVENTION

The invention provides an air intake for a vehicle, such as a snowmobile. In one embodiment, the snowmobile includes a longitudinally extending chassis with both front and rear portions. The chassis supports an engine near the chassis front portion and a seat near the chassis rear portion. The engine includes an air intake that provides ambient air to the intake port of each engine cylinder. The engine powers a drive track connected to the chassis near the chassis rear portion. The chassis front portion mounts a pair of steerable skis and supports a body assembly that contains the engine and the air intake. The body assembly has an opening for allowing ambient air to flow into the body assembly and into a channel of the air intake. The channel extends between first and second openings and defines a hollow throughway for airborne contaminants entering the channel from one of the first and second openings. The channel has an aperture on its wall that is positioned generally parallel to the direction of ambient airflow through the channel and that opens into a passageway leading to the intake port on one or more cylinders of the engine.

In another embodiment, the vehicle includes a longitudinally extending chassis that supports an internal combustion engine and an operator seat. The engine includes an air intake that provides combustion air to an intake port of one or more cylinders of the engine. The chassis supports a body assembly that contains the engine and the air intake and that has an opening for allowing combustion air to flow into the body assembly and into a channel of the air intake. The channel extends between opposing first and second openings and defines a throughway for airborne contaminants entering the channel from either the first or second opening. The channel has an aperture on its wall positioned at an angle of about between 0 and 25 degrees from the direction of combustion airflow through the channel. The aperture opens into a passageway leading to the intake port of one or more cylinders of the engine.

BRIEF DESCRIPTION OF THE DRAWINGS

FIG. 2A is a schematic elevation view showing a front face of the snowmobile of FIG. 1;

DETAILED DESCRIPTION OF PREFERRED EMBODIMENTS OF THE INVENTION

Figure 1:
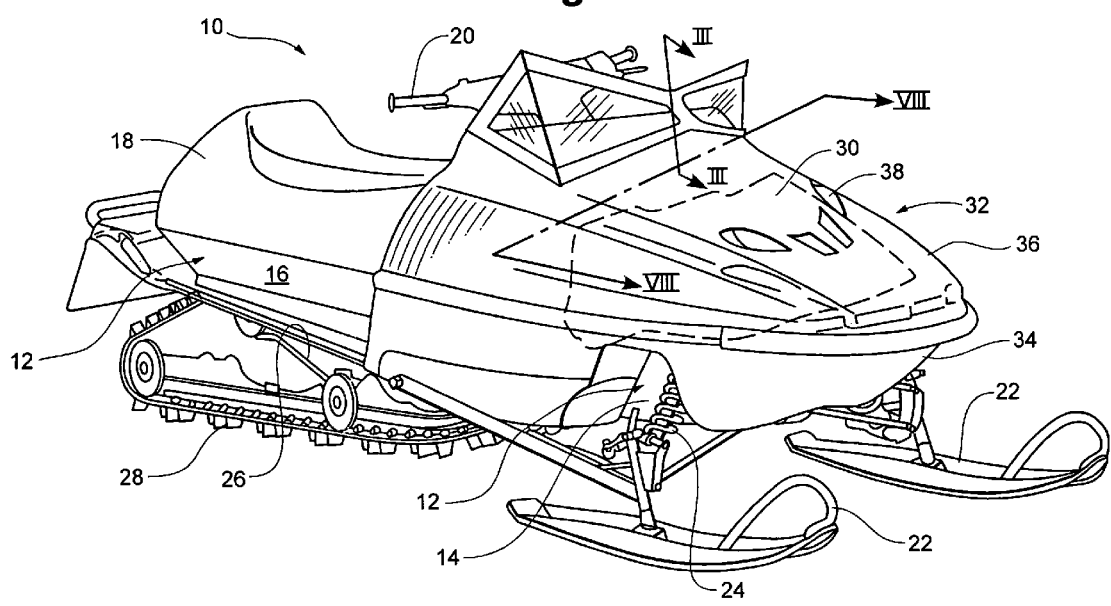
FIG. 1 is a schematic perspective view showing a snowmobile in accordance with certain embodiments of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The air intake system of the invention is exemplified for use on vehicles such as snowmobiles, however, the system may be used on other vehicles utilizing air intakes for internal combustion engines such as motorcycles, all-terrain vehicles, watercraft, and the like.

A snowmobile 10 having a system in accordance with one embodiment of the invention is illustrated in FIG. 1. The snowmobile 10 includes a number of parts formed of suitable materials that cover, protect, and are supported by a longitudinally extending chassis 12. The chassis 12 has a front portion 14 and a rear portion 16. The rear portion 16 of the chassis 12 includes a drive tunnel that supports a seat 18 adapted to carry one or more riders in straddle fashion. A handlebar assembly 20, positioned forwardly of the seat 18, is conventionally connected to a pair of front skis 22 for steering the snowmobile 10. The skis 22 are supported by a suitable front suspension system 24 that is connected to the chassis 12, proximate to the front portion 14. Beneath the seat 18 and within the drive tunnel, a suitable rear suspension 26 is operatively coupled to the drive tunnel (or, alternatively to the chassis 12) and suspends an endless track assembly 28. The endless track 28 is driven by an internal combustion engine indicated generally by reference numeral 30, which is located within a body assembly 32 and supported by the front portion 14 of the chassis 12. Engine 30 is preferably of the two-stroke type, but use of a four-stroke engine with the air intake system of the present invention is also contemplated. Engine 30 may have one or more cylinders, where each cylinder has an intake port or valve that is fluidly connected to the present air intake system. In preferred embodiments, the air intake (not visible) is also located within the body assembly 32.

Figure 2B:
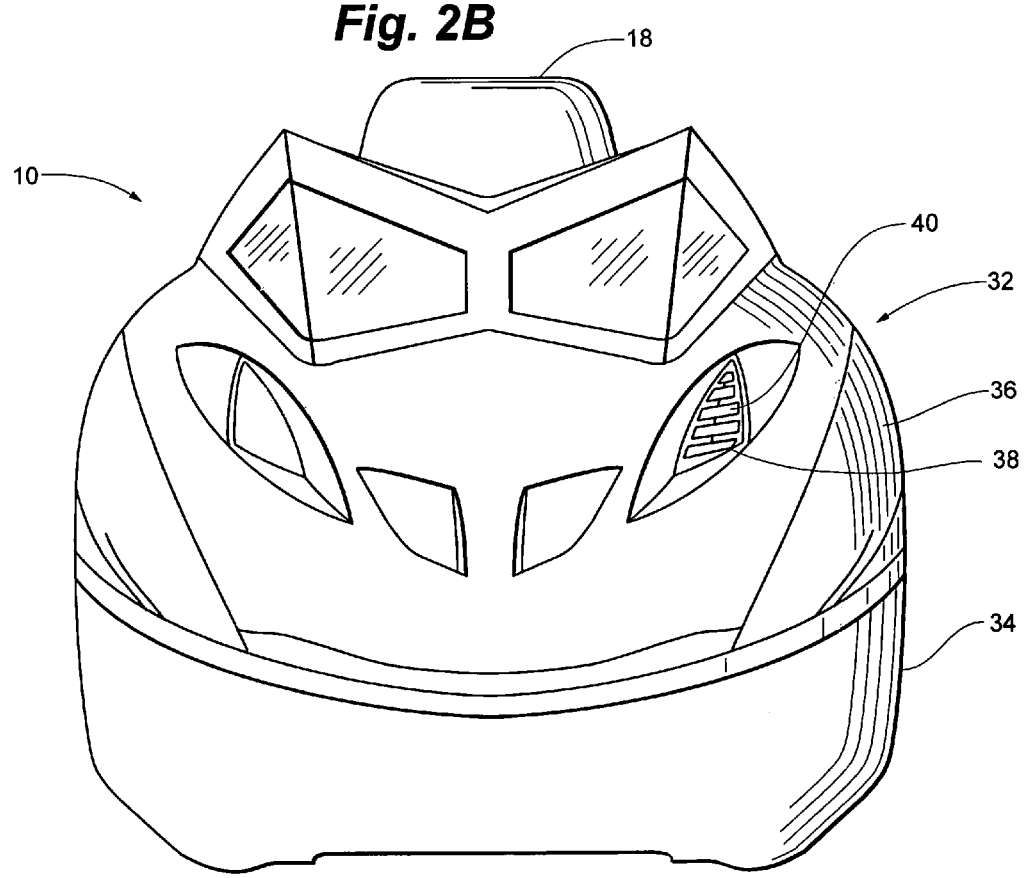
FIG. 2B is a schematic elevation view showing an alternate embodiment of FIG. 2A.

A front face of the snowmobile 10 is shown in FIG. 2A, however, the skis and the handlebars have been removed for simplification. The body assembly 32 includes an upwardly open nose pan 34 covered by a hood 36 on a front portion of the nose pan 34 and a console (not visible in FIG. 2A) on a rear portion of the nose pan 34. Preferably, the hood 36 defines a plurality of holes therein. At least one of these holes is a first opening 38 for the air intake. As described above, the air intake is located within the body assembly 32, underneath the hood 36, and thus, is not visible in FIG. 2A. In certain preferable embodiments, as shown, the first opening 38 is oriented forward of the operator of the vehicle and allows ambient air to flow therethrough. In certain embodiments, as shown in FIG. 2B, the first opening 38 includes a set of adjustable louvers 40 located therein. The louvers 40 enable one to close the first opening 38 if desired. Control of the louver may be manual or automatic. For instance, the louver 40 may be cabled to a handlebar pushbutton or actuator lever that an operator may selectively actuate. Alternatively, the louver 40 may be electro-mechanically actuated via a controller acting through a motor cabled to the louver 40, where the controller acts based on vehicle sensor readings.

Figure 3A:
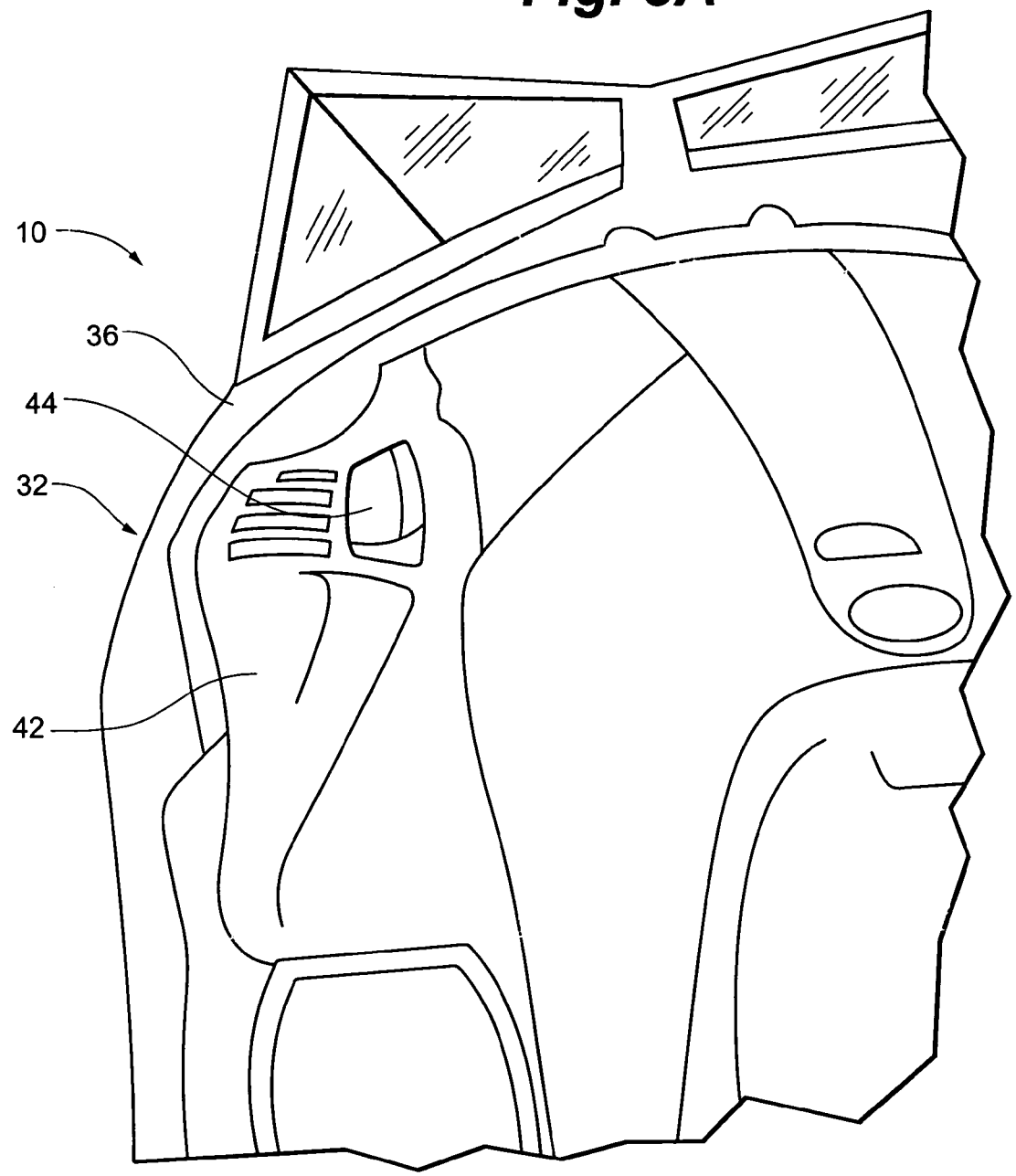
FIG. 3A is a schematic elevation view showing a partial rear sectional view of the snowmobile of FIG. 1 taken along the lines III—III of FIG. 1.
Figure 3B:
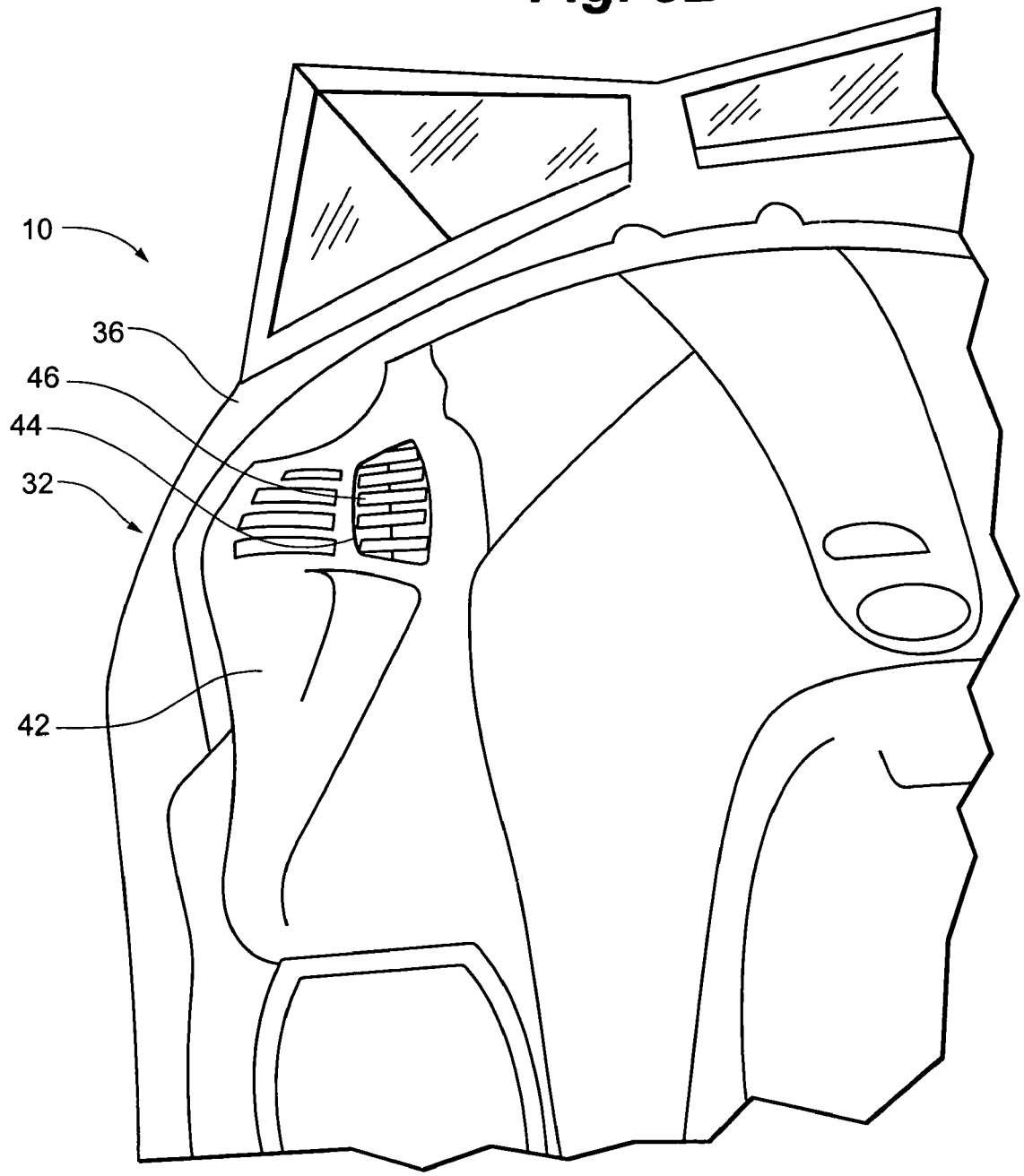
FIG. 3B is a schematic elevation view showing an alternate embodiment of FIG. 3A.

A partial sectional rear view of the snowmobile 10 is illustrated in FIG. 3A, taken along the lines III—III of FIG. 1. As mentioned above, the rear of the body assembly 32 includes the console 42. FIG. 3A shows one side of the console 42. Preferably, the console 42 defines a plurality of holes therein. At least one of these holes is a second opening 44 for the air intake. As mentioned above, the air intake is located within the body assembly 32, underneath the hood 36, and therefore, is not visible in FIG. 3A. In certain preferable embodiments, as shown, the second opening 44 is oriented rearward, located proximate to the operator, and allows ambient air to flow therethrough. In certain embodiments, as shown in FIG. 3B, the second opening 44 includes a set of adjustable louvers 46 located therein. The louvers 46 enable one to close the second opening 44 if desired. Control of the louvers 46 may be manual or automatic and configured as discussed above for louver 40.

Figure 4:
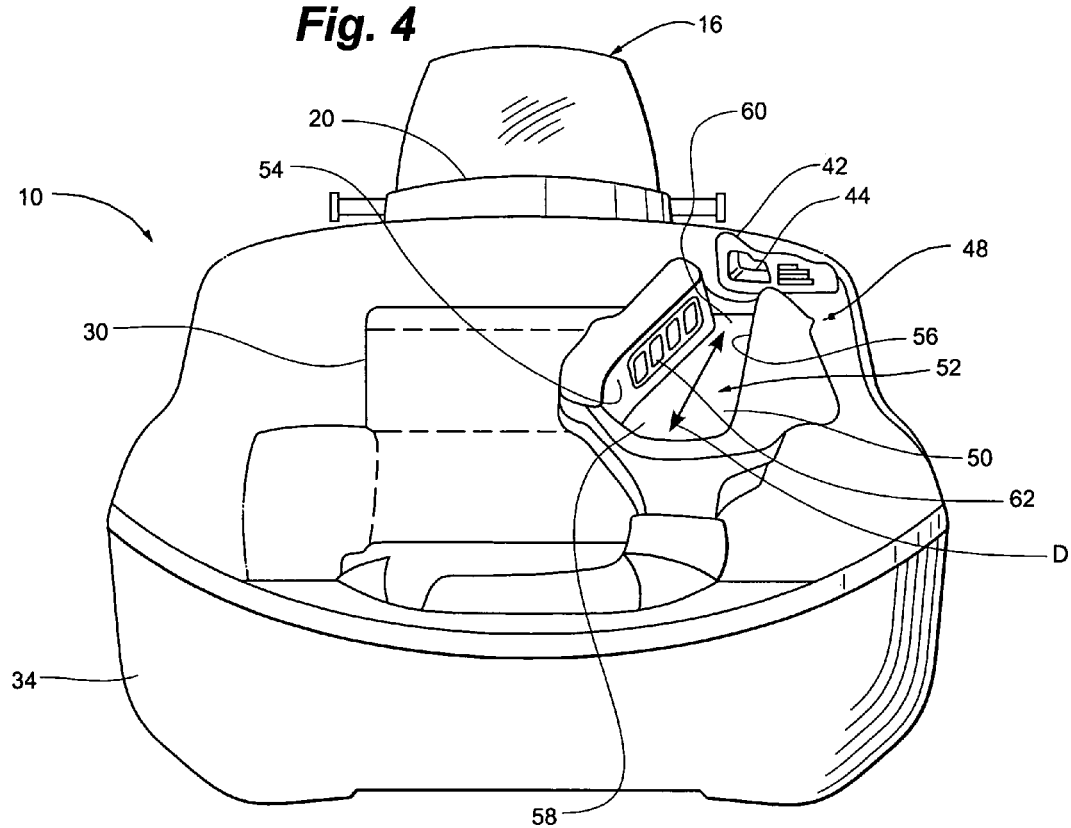
FIG. 4 is a schematic elevation view of FIG. 2A with hood portion removed from the snowmobile of FIG. 1.

A different view of the front face of the snowmobile 10 is shown in FIG. 4. The skis 22 are removed again for simplification, and, in addition, the hood 36 is also removed to show some of the details underneath. As such, the air intake 48 of the snowmobile 10, preferably housed underneath the hood 36, is visible. The air intake 48 has a first portion 50 that preferably defines at least a lower section or base of a channel 52 or passageway.

In certain preferable embodiments, the channel 52 is generally horizontal in orientation and generally rectangular in cross-section shape. In addition, as shown in FIG. 4, channel 52 preferably extends generally longitudinally (i.e., generally front to rear) to comport with the direction of airflow during forward movement of the snowmobile. However, the channel orientation could be modified from anywhere between longitudinal and lateral as long as the incoming airflow through openings 38 or 44 was rerouted into the non-longitudinally oriented channel via ductwork or other air deflectors.

In certain preferable embodiments, the first portion 50 of the air intake 48 defines the lower section of the channel 52. Extending generally vertically upward from the first portion 50 are sidewalls 54, 56 of the channel 52. Hood 36, when secured on the snowmobile 10, defines an upper section of the channel 52 closing off the open top shown in FIG. 4.

Preferably, the channel 52 is wider at one longitudinal end than at an opposing longitudinal end. For instance, as shown in FIG. 4, the channel width gradually narrows from its front longitudinal end 58 to its rear longitudinal end 60. That is, channel sidewalls 54, 56 cant slightly inward (i.e., towards center of channel 52) from front to back to narrow the channel cross-sectional area.

Additionally, in certain preferable embodiments, channel front end 58 is positioned adjacent to the first opening 38 and the channel rear end 60 is positioned adjacent to the second opening 44. With the channel 52 being generally positioned between the first and second openings 38, 44, the ambient air flowing into the channel 52 through either of the openings 38, 44 preferably flows through the channel 52 along path D. In certain preferable embodiments, at least a portion of the ambient air that flows through the channel 52, in turn, flows along paths D and I through at least one aperture 62 defined in the channel 52. Through the natural functioning of the engine 30, the ambient air portion is pulled down through the aperture 62. Preferably, the aperture 62 is formed of one or more bores or slots running longitudinally across the channel 52, and is situated in a generally vertical orientation. In the embodiment shown in FIG. 4, the aperture 62 is positioned on channel sidewall 54, thereby orienting the aperture 62 generally vertical. If a quantity of the ambient air that flows into the channel 52 through one of the first or second openings 38, 44 does not flow through the at least one aperture 62, the air can alternatively exit the channel 52 through one of the openings 38, 44 or can otherwise be directed for other purposes within the body assembly, such as for cooling the engine 30. Preferably, the aperture 62 is positioned generally parallel to or at a slight angle from the direction or natural flow D of the ambient air traveling through the channel 52. Since the sidewalls 54, 56 cant inward front to back, as discussed above, aperture 62 follows this angle. Therefore, the end portion of the aperture 62 nearest to the second opening 44 is inward (i.e., closer to center of channel 52) of the end portion nearest to the first opening 38. In the preferred embodiment shown in FIG. 4, aperture 62 is angled inward at an angle of about 5 degrees. Assuming the airflow direction is reversed (e.g., front louver is closed), it may be advantageous to angle the aperture 62 so that the end portion of the aperture 62 nearest to the second opening 44 is outward (i.e., further from the center of channel 52) of the end portion nearest to the first opening 38.

Accordingly, any angle between 0 degrees (i.e., parallel with airflow D) and about 25 degrees is within the scope of the present design.

By its utilization, the air intake 48 of the invention relocates a large volume of air away from a center of gravity of the snowmobile 10, which allows for mass centralization. In certain preferable embodiments, the ambient air would enter through one opening, e.g., the first opening 38, and flow through the channel 52 along path D. In turn, the air would either flow through the aperture 62 along path I or continue along path D and exit the channel 52 through the opposite opening 44. In addition to the air that may enter the channel 52 through one of the openings 38, 44, airborne contaminants may also flow into the channel 52 through one of the openings 38, 44. However, it is intended for the contaminants to preferably exit the channel 52 through the opposite opening with other exiting air so as to not plug the channel 52 or flow through the aperture 62. Preferably, the aperture 62 is covered by an air filter 63 adapted to permit the air to flow therethrough, yet adapted to prohibit any contaminants from passing therethrough. Examples of such contaminants could generally include water, dirt, debris, and the like that may be found airborne.

Figure 5:
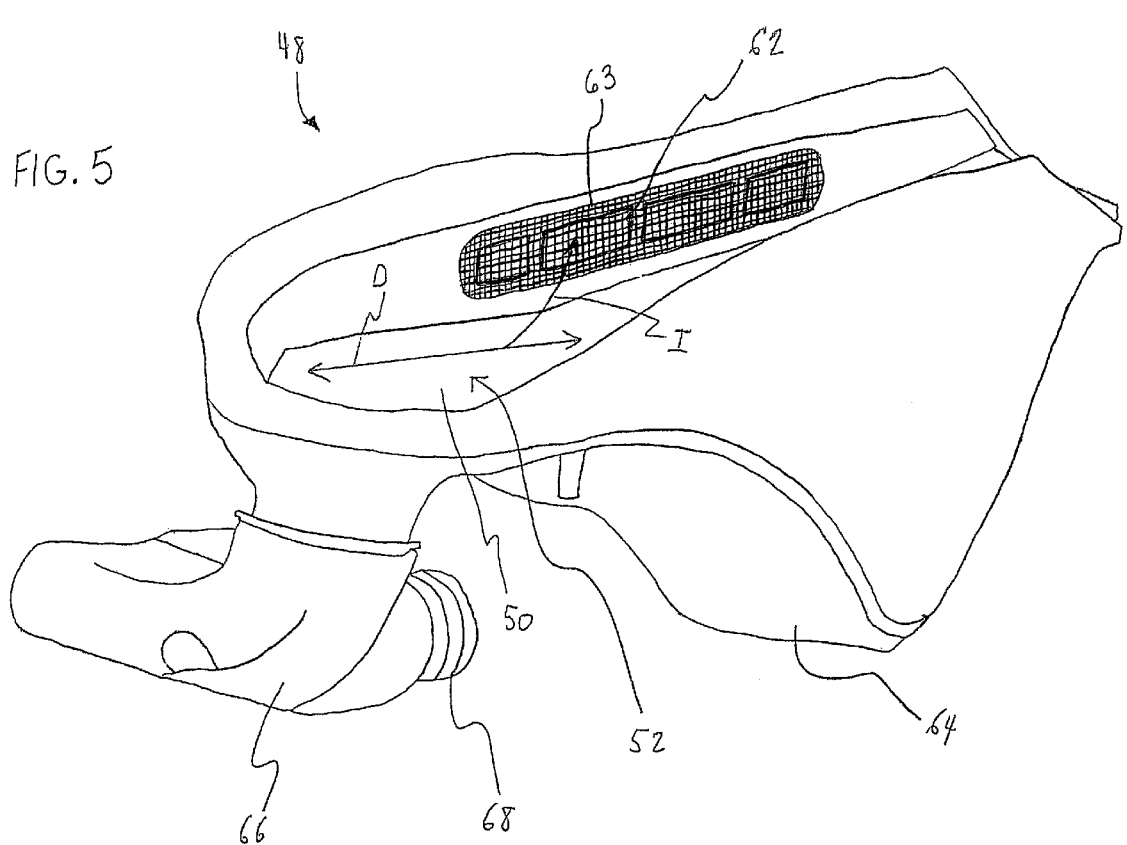
FIG. 5 is a schematic, perspective view showing top and side outer surfaces of an air intake in accordance with certain embodiments of the invention.

The air intake 48 is illustrated in FIG. 5 in accordance with one preferred embodiment of the invention. As described above, the first portion 50 of the air intake 48 preferably defines the lower section of the channel 52. As detailed above, the channel 52 is positioned within the body assembly 32 of the snowmobile 10 to accept and guide air entering the air intake 48 from either the first opening 38 located in the hood 36 or from the second opening 44 located in the console 42. In certain preferable embodiments, the first portion 50 and a second portion 64 of the air intake 48 form an enclosure or passageway therebetween. In certain preferable embodiments, the enclosure is defined by the first and second portions 50 and 64, respectively. The portions 50, 64 can be made up of many materials, however, plastics that are heat-resistant and sturdy, yet light, are preferable. An example of such a material would be high strength glass-filled nylon plastic. If a portion of the air flowing through the channel 52 flows through the aperture 62 located in the channel 52, that air portion enters the enclosure passageway preferably defined by the upper and lower portions 50, 64. As such, the aperture 62 is adapted to permit airflow from the channel 52 into the enclosure passageway. The enclosure passageway is fluidly connected to the inlet ports of the engine cylinders of engine 30 (not shown). Accordingly, aperture 62 opens to a passageway leading to the cylinder intake ports or valves. In certain preferable embodiments, an air box 66 is included between the enclosure passageway defined by 50 and 64 and the cylinder intake ports (port if merely a single cylinder engine). Preferably, the air box 66 subdivides into generally one or more throttle body adapters 68 (only one of which is visible in FIG. 5), with each adapter 68 being used for one of the cylinders of the engine 30.

In certain preferable embodiments described above, the air intake 48 is generally positioned on a side of the body assembly 32 of the snowmobile 10 shown in FIG. 4. However, it is appreciated that the air intake 48 may alternatively be situated in other locations within the body assembly 32. Preferably, the channel 52 is situated so as to function as a passageway for both incoming air and contaminants, whereby at least a portion of the air is directed through the aperture 62 and the airborne contaminants are forced out of the channel 52 via additional incoming air. The air intake 48 preferably includes a single channel 52. However, it is contemplated that an embodiment may exist in which the air intake 48 has a number of channels 52 each with at least one aperture 62. As such, each aperture 62 would connect to a common cavity that effectively directs the air into the engine 30, preferably via the air box 66. Alternatively, each of the channels 52 could have a connection to a separate enclosure, wherein each of the enclosures subsequently directs the air into the engine 30 via air box 66.

In certain preferable embodiments described above, the channel 52 of the air intake 48 is oriented so that it is generally horizontal and shaped so that it is generally rectangular. However, it is contemplated that embodiments may exist in which the channel 52 is oriented at an angle from horizontal or from the longitudinal direction and is formed into any of a variety of different sizes and shapes without departing from the invention. For example, the channel 52 could downwardly slope in orientation from one end to the other. In turn, the air entering the channel 52 could be made to flow at different rates depending on which opening 38 or 44 the air flows therethrough. In addition, the channel 52 could be shaped like a tube instead of being generally rectangular. As such, any contaminants flowing therethrough would be less likely to be impeded by corners in the channel 52. Further, the channel 52 could have a generally constant width across its longitudinal dimension. A's such, there would be no funnel effect created for the air flowing into the channel 52. Moreover, channel 52 could be oriented other than longitudinally (i.e., generally front to rear) such that the ambient or combustion air flows partly or completely laterally. In such a case, the incoming ambient or combustion airflow through openings 38 or 44 needs to be rerouted into the non-longitudinally oriented channel via ductwork or other air deflectors. Even though a certain preferable embodiment described above involves the hood 36 of the snowmobile 10 forming the upper portion of the channel 52, it is contemplated that the upper portion of the channel 52 may be defined separately from the hood 36.

While a preferable aperture 62 is shown in FIGS. 4 and 5 and described above, it is contemplated that embodiments may exist in which the aperture 62 of the channel 52 is positioned in a different location and/or takes the form of any of a variety of differing sizes and shapes without departing from the invention. For example, the aperture 62 may exist in an upper surface of the channel 52 so as to be oriented in a generally horizontal plane. It is less preferable to locate aperture 62 on a lower surface 50 of the channel 52, as the aperture 62 could then likely become blocked or plugged with contaminants settling thereon. In addition, the aperture 62 may form any of a number of bores or slots running longitudinally across the channel 52.

In certain preferable embodiments illustrated above, the upper and lower portions 50 and 64 of the air intake 48 form a particular enclosure shape used for directing the air from the channel 52 to the air box 66. It should be further appreciated that the upper and lower portions 50, 64 could alternatively be shaped to form any of a variety of structures having appropriate ends connecting the channel 52 and the air box 66. For example, one such structure could be a tube. Another such structure could be a funnel. Additionally, instead of the enclosure being formed by upper and lower portions 50 and 64, it should be appreciated that the structure could likewise be formed by a single piece without departing from the spirit of the invention.

Figure 6:
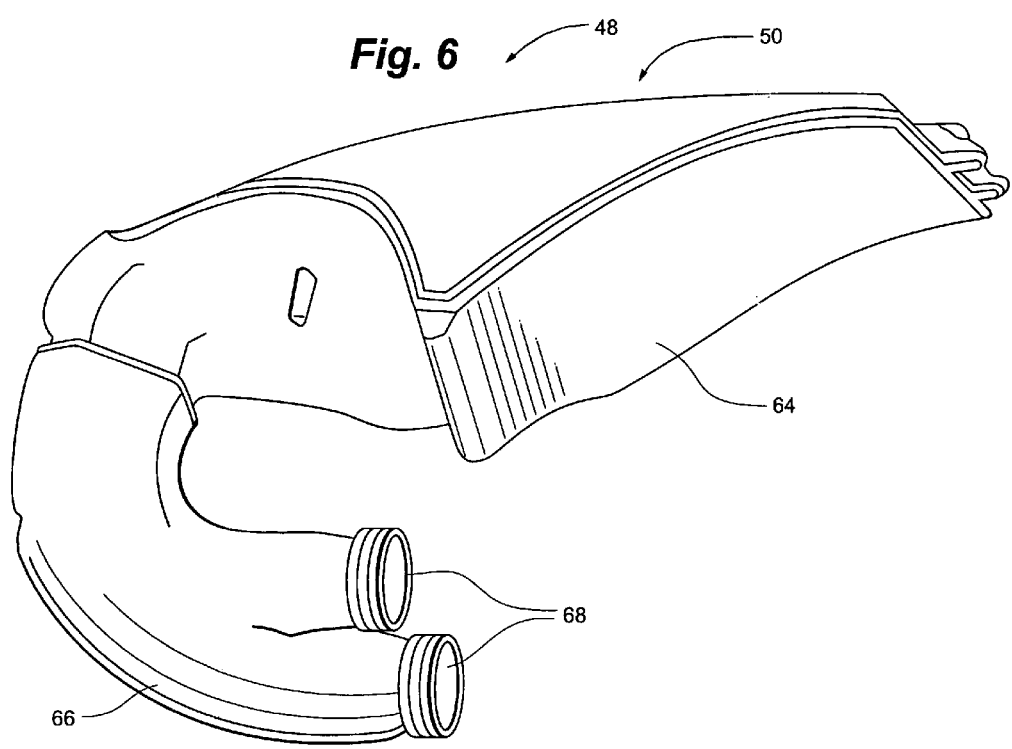
FIG. 6 is a schematic, perspective view showing bottom and side outer surfaces of the air intake of FIG. 5.
Figure 7:
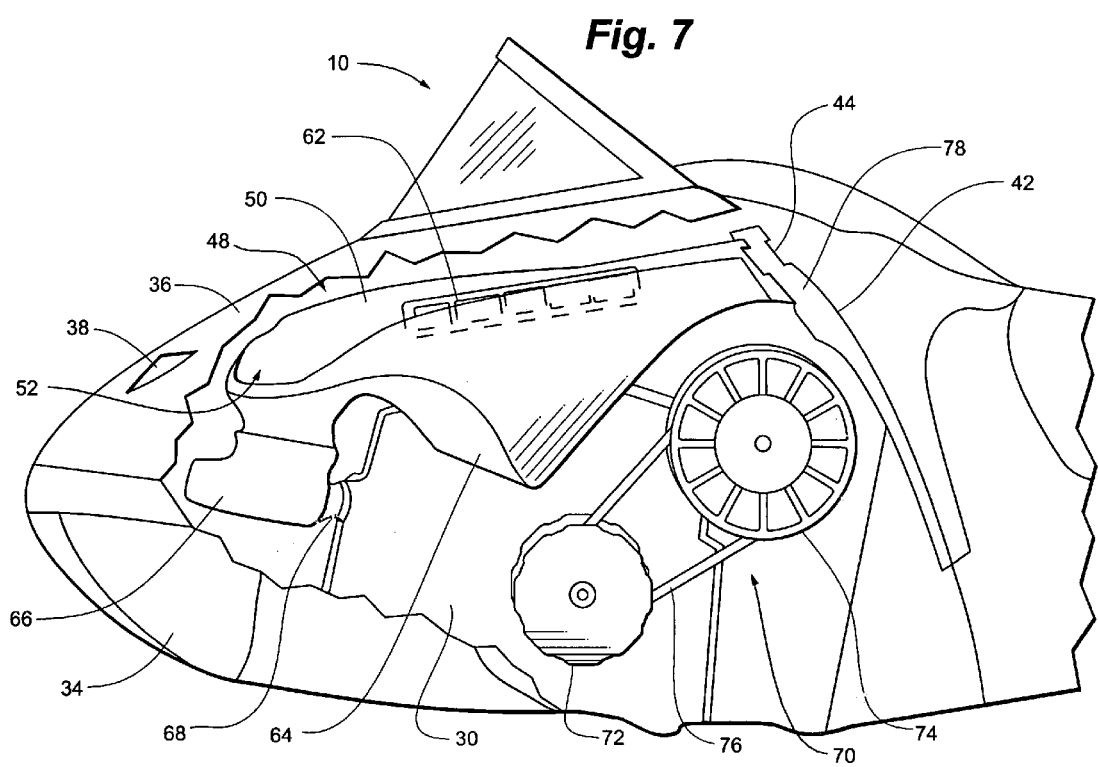
FIG. 7 is a schematic, cutaway side view of a front portion of the snowmobile of FIG. 1.

A different view of the air intake 48 is shown in FIG. 6. From this view, the lower portion 64 of the air intake 48 and the air box 66 are more clearly illustrated. As described above, the upper and lower portions 50, 64 of the air intake 48 can be shaped to form any of a variety of structures and still function as intended. In turn, it is possible to form a structure from the portions 50, 64 that can be used for additional purposes within the engine compartment 32. One of these purposes could involve using the air intake 48 as a separating wall for dividing areas within the body assembly 32. Another purpose could include using the air intake 48 as a shield or guard for one or more areas within the body assembly 32. As shown in FIG. 6, one preferred embodiment of the air intake 48 involves the upper and lower portions 50, 64 being defined to form a structure resembling an inverted pyramid. FIG. 7 illustrates a certain preferable embodiment in which this particular shape is desirable.

A cutaway side view of a front portion of the snowmobile 10 is shown in FIG. 7, with a portion of the hood 36 and adjoining nose pan 34 cut away. The snowmobile 10 is illustrated without the skis 22 and the handlebar assembly 20 shown in FIG. 1. The air intake 48 is positioned above a split sheave continuously variable transmission (CVT) 70 of the engine 30. CVTs are generally used in a variety of recreational type off-road vehicles such as snowmobiles, all-terrain vehicles (ATVs), golf carts, and the like. Typically, CVTs are comprised of a drive clutch 72, a driven clutch 74, and an endless belt 76 disposed about the clutches. The drive clutch 72 includes a pair of opposed sheaves, which together define a generally V-shaped "pulley" within which the belt rides. The driven clutch 74 is similarly configured with a pair of opposed sheaves. CVTs do not require shifting through a series of forward gears, but rather provide a continuously variable gear ratio that automatically adjusts as the vehicle speeds up or slows down, thus providing relatively easy operation for a rider. However, this mechanism is also disadvantageous because, by its very function, the mechanism produces external stress to the drive belt 76 utilized within the CVT 70. This external stress eventually causes the drive belt 76 to break down, with the belt 76 being torn apart or shredded.

Figure 8:
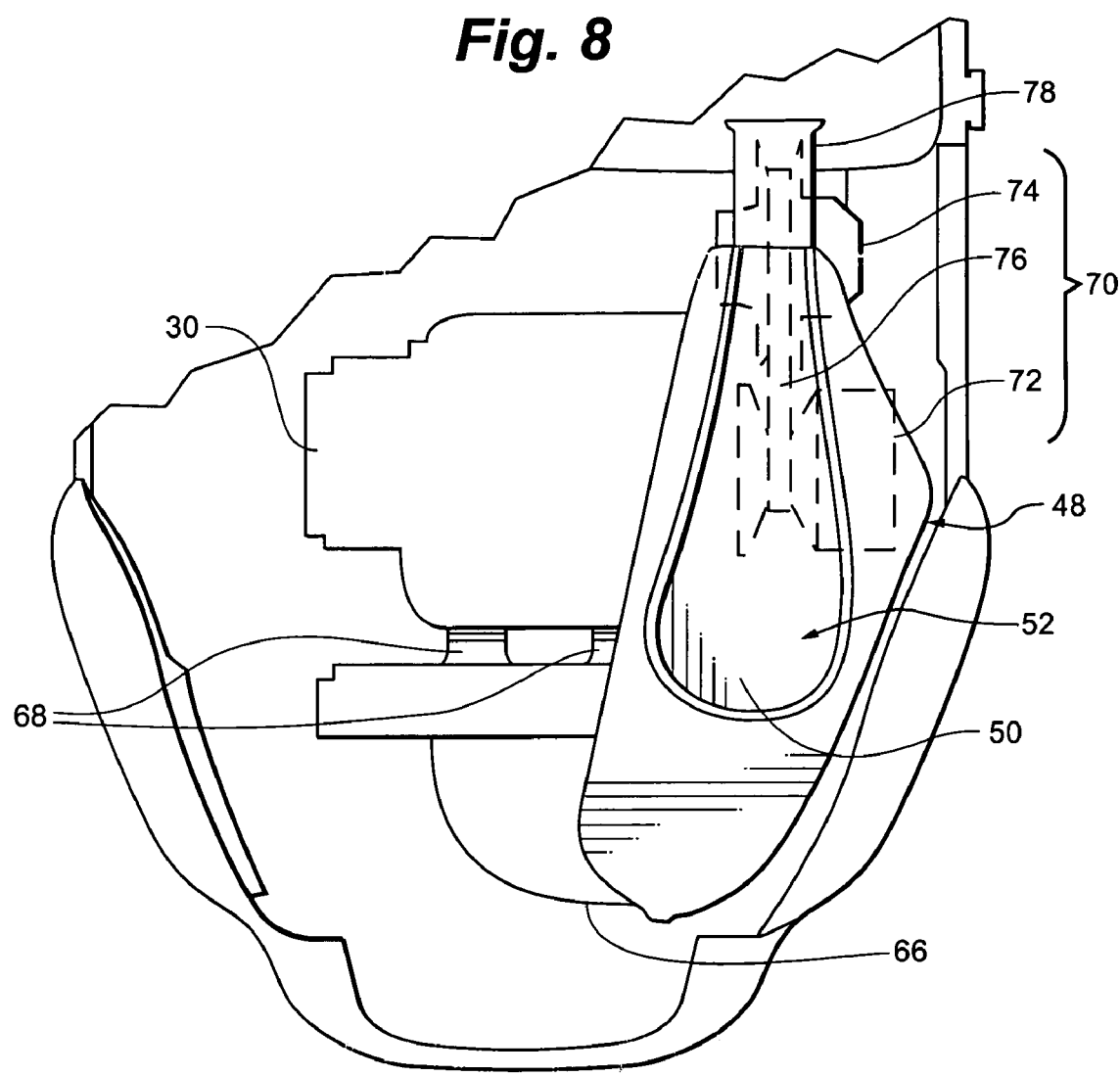
FIG. 8 is a schematic, cross-sectional top view showing a front portion of the snowmobile of FIG. 1 taken along the lines VIII—VIII of FIG. 1.

With this known tearing or shredding of the drive belt 76, it is particularly advantageous to locate the air intake 48 so as to cover an upper portion of the CVT 70. In combination with a rear bracket 78 that is positioned proximate to the console 42 of the snowmobile 10, the air intake 48 (by its lower portion 64) functions as a guard for blocking debris from drive belts 76 that break down in the CVT 70. Specifically, the air intake 48 would stop the drive belt debris from traveling towards the operator. FIG. 8 is a cross-sectional top view of the snowmobile of FIG. 1 taken along the lines VIII—VIII in FIG. 1, and further illustrates the surface area of the air intake 48. As shown, the air intake 48 along with the rear bracket 78 effectively covers an upper portion of the CVT 70 and the drive belt 76 running therein (indicated with dashed lines). With the air intake 48 providing this secondary function, a number of parts generally making up a guard for the CVT 70 are not necessary. In turn, using such a multi-functional air intake 48 would reduce the cost of the vehicle.

While a preferred embodiment is described above regarding an air intake 48 that serves more than one purpose (i.e., routing air to the engine 30 and covering the CVT 70), it should be appreciated that the air intake 48 could just as well be used solely as an air intake, as normally intended. While the preferred embodiment detailed above teaches to form the air intake 48 to a particular shape (i.e., an inverted pyramid) to provide the additional function of blocking debris from drive belts 76 that break apart within the CVT 70, the air intake 48 could just as well form a shape only intended to form a cavity for directing the air to the engine 30. Thus, while a preferred embodiment is provided above for the air intake 48, it is not done to limit the invention as such.

The air intake 48 of the invention provides many benefits for consumers as well as manufacturers of vehicles utilizing such structures. In one embodiment detailed above, the air intake 48 is generally limited to two members, a first portion 50 defining the channel 52 and a second portion 64 working with the first portion 50 to define the cavity. As such, the fabrication and assembly of the air intake 48 is relatively simple and straight-forward. In use, the air intake 48 provides a system which routes ambient air to the engine 30, yet simultaneously functions as a throughway for airborne contaminants. As such, the air intake 48 reduces the likelihood of contaminants accumulating inside and plugging the air intake 48, which can affect engine performance and proper operation. Preferably, the channel 52 of the air intake 48 is adapted to direct any excess incoming air and contaminants mixed with the air out the channel 52. Even in a case in which the air intake 48 becomes plugged on one end, the system provides for an additional entryway for the incoming air. For example, if the first opening 38 becomes plugged with snow (which is often the case when traveling in deep snow), the air intake 48 would remain functional due to the second opening 44 not being plugged. Additionally, the air intake 48 prohibits airborne contaminants from passing through the air intake 48 to the engine 30, where such contaminants could likely cause damage. In use, the air intake 48 additionally provides a system which reduces the amount of engine noise heard by the operator. The air intake 48 preferably is configured to form a large volume with low mass. In certain preferable embodiments, the air intake 48, particularly the second portion 64, is fabricated with a material designed to attenuate specific frequencies emitted from an internal combustion engine. An example of such a material would be high strength glass filled nylon plastic. As such, the air intake 48 would additionally function in silencing the intake noise from the engine 30. In use, the air intake 48 may optionally provide a system that has one or more other functions in addition to its function of routing air to the engine 30. Examples of these other functions may include dividing, containing, or covering certain areas within the body assembly 32. One particular example of such involves the air intake 48 being secured over a CVT 70. Used in combination with a rear bracket 78, the air intake 48 (i.e., the second portion 64 thereof) could be used to provide containment for drive belts 76 breaking down within the CVT 70.

As described above, one function of the air intake 48 is to reduce the noise coming from the engine 30 that would normally affect the operator or would be heard by the operator. This can be accomplished by locating the air intake 48 forward of the operator, as described above. Additionally, a reduction in noise can be facilitated by using appropriate materials in fabricating the air intake 48 which work to attenuate the noise, as also described above. Finally, adjustable mechanisms could be used on one or more of the first and second openings 38, 44 in order to further reduce the engine noise, as shown in FIGS. 2B and 3B. In certain preferable embodiments, the mechanisms would include louvers 40, 46 respectively placed on one or more of the openings 38, 44. While not shown, doors could be used for the openings as well. In use, the mechanisms would preferably facilitate a variety of settings for the air intake 48. One exemplary setting would involve closing the first opening 38, while leaving the second opening 44 open. As a consequence, the likelihood of contaminants entering the channel 52 of the air intake 48 would be decreased. Additionally, with this setting, an operator would be able to maintain or regulate the engine intake temperature in extreme cold weather operation, and thus, improve engine performance. Another exemplary setting would involve leaving the first opening 38 open while closing the second opening 44. By doing so, an operator could supercharge the engine 30 by directing all incoming air into the engine 30 as the vehicle speed increases, and thereby, improve engine performance. It is fully contemplated that variations of the above two examples could be provided to attain advantages of both. For example, one could keep the first and second openings 38, 44 open halfway to achieve some degree of supercharging, while maintaining a certain engine temperature. One other exemplary setting involves closing both openings 38, 44. Generally, this setting would be used when the vehicle is not being used. With this setting, one could prevent rodents or pests from entering the air intake 48 during storage periods, which would be most advantageous during storage periods for the vehicles.

While embodiments of the present invention have been described, it should be understood that various changes, adaptations, and modifications may be made therein without departing from the spirit of the invention and the scope of the appended claims.

What is claimed is:

1. A snowmobile comprising:
a longitudinally extending chassis having a front portion and a rear portion, the chassis supporting an engine proximate the front portion and an operator seat proximate the rear portion, the engine including an air intake for providing ambient air to an intake port of one or more cylinders of the engine, the engine powering a drive track operatively connected to the chassis proximate the rear portion, the chassis front portion mounting a pair of steerable skis and supporting a body assembly, the body assembly containing the engine and the air intake, the body assembly having a first opening for allowing ambient air to flow into the body assembly and into a channel of the air intake, the channel extending between first and second channel openings and defining a hollow throughway for airborne contaminants entering the channel from one of the first and second openings, the channel having an aperture on a wall thereof, the aperture positioned generally parallel to the direction of ambient airflow through the channel and opening into a passageway leading to the intake port of one or more cylinders of the engine, the body assembly having a second opening providing an outlet for airflow from the channel, the second body assembly opening equipped with a louver that selectively opens and closes the second body assembly opening.

2. The snowmobile of claim 1, wherein the first body assembly opening directs air into the first channel opening.

3. The snowmobile of claim 1, wherein the first body assembly opening faces generally forward, whereby ambient air is naturally directed into the first body assembly opening during forward movement of the snowmobile.

4. The snowmobile of claim 1, wherein the first body assembly opening is in a hood.

5. The snowmobile of claim 1, wherein the first and second channel openings provide a natural inlet and outlet for ambient air and other airborne debris.

6. The snowmobile of claim 1, wherein the channel is adapted to direct airborne contaminants that enter the channel through one of the channel openings to exit out the other opening in the channel without flowing through the aperture.

7. The snowmobile of claim 1, wherein the channel extends generally longitudinally between the first and second openings in the channel.

8. The snowmobile of claim 7, wherein the aperture is positioned generally parallel to the longitudinal dimension of the channel.

9. The snowmobile of claim 1, wherein the channel is generally straight.

10. The snowmobile of claim 1, wherein the channel cross-sectional area tapers from one opening of the channel to the other opening of the channel.

11. The snowmobile of claim 1, wherein the aperture is oriented generally vertically.

12. The snowmobile of claim 1, wherein the aperture includes a filter adapted to prohibit airborne contaminants in the channel from passing through the aperture.

13. The snowmobile of claim 1, wherein the air flowing out the channel is directed through the second opening in the body assembly.

14. The snowmobile of claim 1, wherein the second opening in the body assembly is located in a rider console area.

15. The snowmobile of claim 1, wherein the first body assembly opening is equipped with a louver that selectively opens and closes the first body assembly opening.

16. The snowmobile of claim 1, further comprising a continuously variable transmission operatively connected between engine and the drive track and contained within the body assembly, the air intake covering a portion of the continuously variable transmission.

17. The snowmobile of claim 1, wherein the aperture is positioned at an angle of about between 0 and 25 degrees from the direction of ambient airflow through the channel.

18. The snowmobile of claim 17, wherein the aperture is positioned at an angle of about between 0 and 5 degrees from the direction of ambient airflow through the channel.

19. A vehicle comprising:
a longitudinally extending chassis supporting an internal combustion engine and an operator seat, the engine including an air intake for providing combustion air to an intake port of one or more cylinders of the engine, the chassis supporting a body assembly containing the engine and the air intake, the body assembly having an opening for allowing combustion air to flow into the body assembly and into a channel of the air intake, the channel extending between opposing first and second channel openings and defining a throughway for airborne contaminants entering the channel from one of the first and second openings, the channel having inner side walls that cant inward from one of the first and second channel openings to the other of the first and second channel openings the channel having an aperture on one of the inner side walls a thereof, the aperture opening into a passageway leading to the intake port of one or more cylinders of the engine.

20. The vehicle of claim 19, wherein the body assembly opening faces generally forward, whereby combustion air is naturally directed into the opening in the body assembly during forward movement of the vehicle.

21. The vehicle of claim 19, wherein the first and second channel openings provide a natural inlet and outlet for combustion air and other airborne debris.

22. The vehicle of claim 19, wherein the channel is adapted to direct airborne contaminants that enter the channel through one of the first and second openings to exit out the other of the first and second openings in the channel without flowing through the aperture.

23. The vehicle of claim 19, wherein the channel extends generally longitudinally between the first and second openings in the channel.

24. The vehicle of claim 19, wherein the channel is generally straight.

25. The vehicle of claim 19, further including a second opening in the body assembly providing an outlet for airflow from the channel.

26. The vehicle of claim 25, wherein the air flowing out the channel is directed through the second opening in the body assembly.

27. The vehicle of claim 19, wherein the aperture cants inward at an angle of about 5 degrees from one of the first and second channel openings to the other of the first and second channel openings.

28. The vehicle of claim 19, wherein the aperture includes a filter adapted to prohibit airborne contaminants in the channel from passing through the aperture.

29. A method of configuring an engine air intake on a vehicle to provide supercharged combustion air to an intake port of an engine cylinder, comprising:
    opening an inlet of an intake channel, the intake channel inlet receiving increased airflow therethrough during forward movement of the vehicle, the intake channel having an aperture on a wall thereof and opening into a passageway leading to the intake port of the engine cylinder; and
    closing all outlets of the intake channel.

30. The method of claim 29, wherein the opening step comprises opening a louver leading to the inlet of the intake channel.

31. The method of claim 29, wherein the closing step comprises closing a louver blocking all outlets of the intake channel.

* * * * *

UNITED STATES PATENT AND TRADEMARK OFFICE
CERTIFICATE OF CORRECTION

| | |
|---|---|
| PATENT NO. | : 7,040,437 B1 |
| APPLICATION NO. | : 10/752280 |
| DATED | : May 9, 2006 |
| INVENTOR(S) | : Frederickson et al. |

It is certified that error appears in the above-identified patent and that said Letters Patent is hereby corrected as shown below:

In Column 10, Line 64, after the word "openings" insert --,--.

In Column 10, Line 65, delete the word "a" after the word "walls".

Signed and Sealed this

Twenty-second Day of August, 2006

JON W. DUDAS
*Director of the United States Patent and Trademark Office*